US012424757B2

(12) United States Patent
Huang et al.

(10) Patent No.: US 12,424,757 B2
(45) Date of Patent: Sep. 23, 2025

(54) ON-BOARD ANTENNA, RADIO DEVICE, AND ELECTRONIC APPARATUS

(71) Applicant: CALTERAH SEMICONDUCTOR TECHNOLOGY (SHANGHAI) CO., LTD, Shanghai (CN)

(72) Inventors: Xuejuan Huang, Shanghai (CN); Dian Wang, Shanghai (CN); Shan Li, Shanghai (CN); Zhefan Chen, Shanghai (CN); Kaijie Zhuang, Shanghai (CN)

(73) Assignee: CALTERAH SEMICONDUCTOR TECHNOLOGY (SHANGHAI) CO., LTD, Shanghai (CN)

( * ) Notice: Subject to any disclaimer, the term of this patent is extended or adjusted under 35 U.S.C. 154(b) by 125 days.

(21) Appl. No.: 18/114,355

(22) Filed: Feb. 27, 2023

(65) Prior Publication Data

US 2023/0238706 A1 Jul. 27, 2023

Related U.S. Application Data

(63) Continuation of application No. PCT/CN2022/116548, filed on Sep. 1, 2022.

(30) Foreign Application Priority Data

Dec. 1, 2021 (CN) ........................ 202122989598.X

(51) Int. Cl.
*H01Q 9/04* (2006.01)
*H01Q 1/42* (2006.01)

(52) U.S. Cl.
CPC .......... *H01Q 9/0485* (2013.01); *H01Q 1/422* (2013.01)

(58) Field of Classification Search
CPC .... H01Q 1/3233; H01Q 1/52; H01Q 21/0075; H01Q 21/08
See application file for complete search history.

(56) References Cited

U.S. PATENT DOCUMENTS

2013/0241778 A1* 9/2013 Orime ................ H01Q 15/0006 343/700 MS
2015/0364830 A1* 12/2015 Tong ........................ H10F 71/00 342/27

(Continued)

FOREIGN PATENT DOCUMENTS

CN 110546815 A 12/2019
CN 212162081 U 12/2020

(Continued)

OTHER PUBLICATIONS

European Search Report for EP Application No. 22798687.4-1205/4178033 PCT/CN2022116548, dated Feb. 7, 2024, 9 pages.

(Continued)

*Primary Examiner* — Alexander H Taningco
(74) *Attorney, Agent, or Firm* — BROOKS KUSHMAN P.C.

(57) ABSTRACT

An onboard antenna, a radio equipment and an electronic device. The onboard antenna includes a dielectric substrate, an antenna and a metal block, wherein the antenna is located on the dielectric substrate, a projection of the metal block on a plane where the dielectric substrate is located is not overlapped with a projection of the antenna on the plane where the dielectric substrate is located, the metal block is located on the dielectric substrate in a polarization direction of the antenna, and a distance between a metal edge of the metal block on a side close to the antenna and the antenna is greater than a coupling threshold. Using this onboard antenna, an influence of surface waves on the pattern can be (Continued)

suppressed to a certain extent by arranging the metal block, and a jitter of the antenna pattern can be reduced.

15 Claims, 7 Drawing Sheets

(56) References Cited

U.S. PATENT DOCUMENTS

| | | | | |
|---|---|---|---|---|
| 2018/0366818 | A1* | 12/2018 | Kawaguchi | H01Q 19/005 |
| 2019/0280385 | A1* | 9/2019 | Suematsu | H01Q 21/24 |
| 2020/0052396 | A1 | 2/2020 | Sakai et al. | |
| 2020/0176877 | A1* | 6/2020 | Kim | H01Q 21/24 |
| 2021/0044011 | A1* | 2/2021 | Liu | H01Q 21/065 |
| 2021/0359404 | A1* | 11/2021 | Johansson | H01Q 21/065 |
| 2023/0352815 | A1* | 11/2023 | Dadgarpour | H01Q 5/42 |

FOREIGN PATENT DOCUMENTS

| | | | |
|---|---|---|---|
| CN | 212323215 | U | 1/2021 |
| CN | 213878429 | U | 8/2021 |
| CN | 113594679 | A | 11/2021 |
| JP | 2009212727 | A | 9/2009 |
| JP | 2020053908 | A | 4/2020 |
| KR | 20150119977 | A | * 10/2015 |

OTHER PUBLICATIONS

Mosalanejad et al., Wideband Compact Comb-Line Antenna Array for 79 GHz Automotive Radar Applications, IEEE Antennas and Wireless Propagation Letters, Sep. 2018, 1580-1583, vol. 17, No. 9, European Patent Office.

International Search Report for Application No. PCT/CN2022/116548, dated Nov. 9, 2022, 4 Pages (including English Translation).

* cited by examiner

ON-BOARD ANTENNA, RADIO DEVICE, AND ELECTRONIC APPARATUS

CROSS-REFERENCE TO RELATED APPLICATIONS

This application is a continuation of International Application No. PCT/CN2022/116548, filed on Sep. 1, 2022, which claims the priority to Chinese patent application No. 202122989598.X, filed on Dec. 1, 2021, which are incorporated herein by reference in their entireties.

TECHNICAL FIELD

Embodiments of the present disclosure relate to, but are not limited to, the field of antenna technologies, in particular to an onboard antenna, a radio equipment and an electronic device.

BACKGROUND

With development in autonomous driving and other fields, a great attention has been paid on automotive radars. The performance of an antenna, which is an important part of a radar system, affects resulted function of whole radar system.

In a structure of traditional radar antenna, an antenna radiation unit is directly placed on a substrate. However, due to high RF frequency (such as millimeter wave radar), it is easy to excite surface waves on the substrate. In a polarization direction of the antenna, a pattern is easily affected by the surface waves to jitter greatly, which leads to the deterioration, even the distortion of the pattern.

However, a jitter of a radar antenna pattern degrades a detection performance at some angles, and leads to an imbalance between different transceiving channels, which affects an angle resolution accuracy of a radar system.

SUMMARY

The following is a summary of the subject matter described in detail herein. This summary is not intended to limit the protection scope of the claims.

An onboard antenna is provided in an embodiment of the present disclosure, which includes a dielectric substrate, an antenna, and a metal block.

The antenna is located on the dielectric substrate, a projection of the metal block on a plane where the dielectric substrate is located is not overlapped with a projection of the antenna on the plane where the dielectric substrate is located, the metal block is located on the dielectric substrate in a polarization direction of the antenna, and a distance between a metal edge of the metal block on a side close to the antenna and the antenna is greater than a coupling threshold.

Alternatively, the dielectric substrate includes a first substrate edge, a second substrate edge, a third substrate edge and a fourth substrate edge; wherein the first substrate edge is one edge of the dielectric substrate in the polarization direction, the second substrate edge is another edge of the dielectric substrate in the polarization direction, the third substrate edge is an edge intersecting with the first substrate edge, and the fourth substrate edge and the third substrate edge are opposite edges.

Alternatively, a thickness of the metal block is the same as a thickness of the antenna.

Alternatively, the metal block includes a first metal block and/or a second metal block, wherein the first metal block is located between the first substrate edge of the dielectric substrate and the antenna, and the second metal block is located between the second substrate edge of the dielectric substrate and the antenna.

Alternatively, a first metal edge of the first metal block away from the antenna is apart from the first substrate edge by a first set value, the antenna is apart from a second metal edge of the first metal block by a second set value, the first metal edge of the first metal block and the second metal edge of the first metal block are opposite edges, and the second set value is greater than the coupling threshold.

Alternatively, a third metal edge of the first metal block is apart from the third substrate edge of the dielectric substrate by a third set value, a fourth metal edge of the first metal block is apart from the fourth substrate edge of the dielectric substrate by a fourth set value, and the third metal edge of the first metal block and the fourth metal edge of the first metal block are opposite sides.

Alternatively, a first metal edge of the second metal block away from the antenna is apart from the second substrate edge by a fifth set value, the antenna is apart from a second metal edge of the second metal block by a sixth set value, the first metal edge of the second metal block and the second metal edge of the second metal block are opposite edges, and the sixth set value is greater than the coupling threshold.

Alternatively, a third metal edge of the second metal block is apart from the third substrate edge by a seventh set value, a fourth metal edge of the second metal block is apart from the fourth substrate edge by an eighth set value, and the third metal edge of the second metal block and the fourth metal edge of the second metal block are opposite edges.

Alternatively, the metal block further includes a third metal block and/or a fourth metal block, wherein the third metal block is located between the third substrate edge of the dielectric substrate and the antenna, and the fourth metal block is located between the fourth substrate edge of the dielectric substrate and the antenna.

Alternatively, a first metal edge of the third metal block is apart from the third substrate edge by a ninth set value, the antenna is apart from a second metal edge of the third metal block by a tenth set value, the first metal edge of the third metal block and the second metal edge of the third metal block are opposite edges, and the tenth set value is greater than the coupling threshold.

Alternatively, a first metal edge of the fourth metal block is apart from the fourth substrate edge by an eleventh set value, the antenna is apart from a second metal edge of the fourth metal block by a twelfth set value, the first metal edge of the fourth metal block and the second metal edge of the fourth metal block are opposite edges, and the twelfth set value is greater than the coupling threshold.

Alternatively, a third metal edge of the third metal block and/or a third metal edge of the fourth metal block are located on an extension line of the second metal edge of the first metal block, and the first metal edge of the third metal block is connected to the third metal edge of the third metal block.

Alternatively, a fourth metal edge of the third metal block and/or a fourth metal edge of the fourth metal block are located on an extension line of the second metal edge of the second metal block, the third metal edge of the third metal block and the fourth metal edge of the third metal block are opposite edges, and the third metal edge of the fourth metal block and the fourth metal edge of the fourth metal block are opposite edges.

Alternatively, the antenna is an array antenna.

A radio equipment is further provided in an embodiment of the present disclosure, which includes an onboard antenna in any embodiment of the present disclosure and an integrated circuit, wherein the integrated circuit transmits and/or receives radio signals through the onboard antenna, to achieve target detection and/or communication.

Alternatively, the radio equipment includes a radar sensor, such as a millimeter wave radar sensor.

An electronic device is further provided in an embodiment of the present disclosure, which includes:

a device body; and, a radio equipment in any embodiment of the present disclosure, which is arranged on the device body;

wherein the radio equipment is configured to perform target detection and/or communication to provide reference information for operation of the device body in the electronic device.

An onboard antenna, a radio equipment and an electronic device are provided in the embodiments of the present disclosure. The onboard antenna includes a dielectric substrate, an antenna and a metal block, wherein the antenna is located on the dielectric substrate, a projection of the metal block on a plane where the dielectric substrate is located is not overlapped with a projection of the antenna on the plane where the dielectric substrate is located, the metal block is located on the dielectric substrate in a polarization direction of the antenna, and a distance between a metal edge of the metal block on a side close to the antenna and the antenna is greater than a coupling threshold. The onboard antenna can suppress an influence of surface waves on the pattern to a certain extent by arranging the metal block, and reduce a jitter of the antenna pattern.

Other aspects will become apparent after reading and understanding the drawings and detailed description.

DETAILED DESCRIPTION

Figure 1:
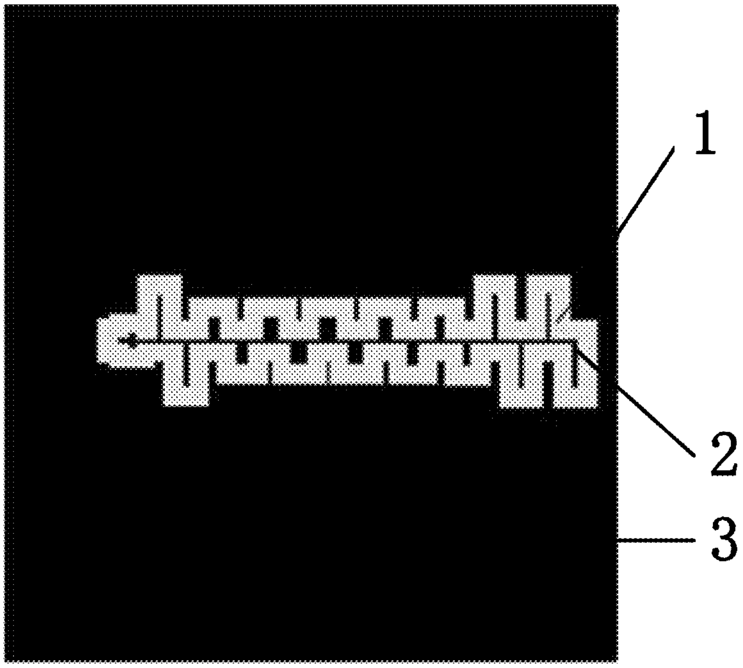
FIG. 1 is a schematic diagram of a structure of an onboard antenna provided in an exemplary embodiment of the present disclosure.

The present disclosure is described in detail below in conjunction with the accompanying drawings and exemplary embodiments. It should be understood that the exemplary embodiments described herein are intended only to explain and not to restrict the present disclosure. In addition, for ease of description, only a portion and not all of the structure related to the present disclosure are shown in the drawings.

Furthermore, exemplary embodiments of the present disclosure and features in the exemplary embodiments may be combined with each other if there is no contradiction. Alternative features and examples are provided in each of the following exemplary embodiments and a plurality of features described in the exemplary embodiments may be combined to form a plurality of alternatives.

In the description of the present disclosure, orientational or positional relationships indicated by terms “center”, “up”, “down”, “left”, “right”, “front”, “back” and the like are based on the orientational or positional relationships shown in the drawings. For example, “up” and “down” are set along the header and footer directions of paper, “left” and “right” are set in the direction facing the paper, “front” is perpendicular to the paper and facing the paper from the back, and “back” is perpendicular to the paper and facing the paper from the front of the paper to the back of the paper. Such settings are intended for ease of description of the present disclosure only and are not intended to indicate that the apparatus or element in question must have a particular orientation and therefore cannot be construed as limiting the present disclosure. Furthermore, the technical features or technical solutions involved in different embodiments of the present disclosure described below may be combined with each other as long as there is no contradiction to each other.

FIG. 1 is a schematic diagram of a structure of an onboard antenna provided in an exemplary embodiment of the present disclosure, and the embodiment can be applied to a case of detection based on a millimeter wave radar. The onboard antenna can be contained within a radio equipment, wherein the radio equipment is typically integrated into an electronic device.

The millimeter wave radar according to the embodiment of the present disclosure operates in a millimeter wave band, which is generally referred to a frequency band of 30 GHz to 300 GHz (a wavelength of the millimeter wave band is selected from 1 mm to 10 mm). Compared with radars in other forms, the millimeter wave radar has advantages of high precision, high resolution, long distance, all-weather and all-time capability, small dimension and so on. However, compared with low frequency band, a millimeter wave has a high frequency and it is easy to excite surface waves that cause the deterioration, even the distortion of the pattern. In a design of a millimeter wave radar antenna, the antenna on large-size substrate is affected by surface waves, which easily leads to a jitter of a pattern. Thus, a detection performance at some angles is degraded, and leads to an imbalance between different transceiving channels, which affects an angle resolution accuracy of a radar system. In addition, the scheme in the embodiment of the present disclosure can also be applied to communication or radar device in high frequency bands such as 6 GHz and 24 GHz frequency bands, as long as the above problems occur in the antenna pattern.

Taking a millimeter wave radar as an example, a technical scheme according to the embodiment of the present disclosure is described in detail.

Figure 2:
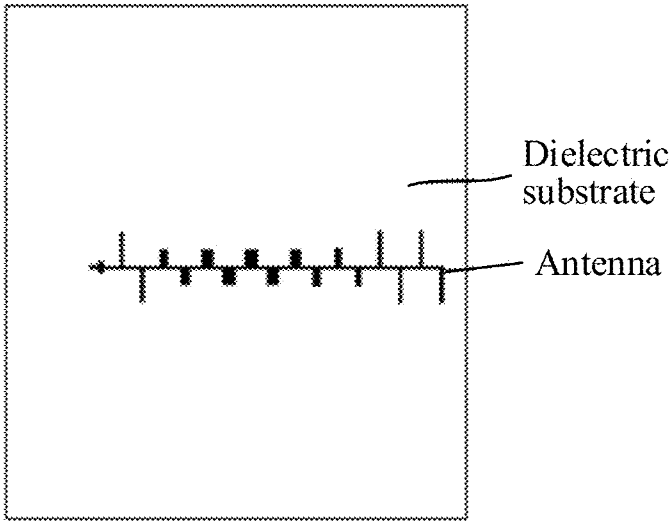
FIG. 2 is a schematic diagram of a structure of a millimeter wave radar antenna.

FIG. 2 is a schematic diagram of a structure of a millimeter wave radar antenna. As shown in FIG. 2, in the structure of the millimeter wave radar antenna, an antenna radiation unit is directly placed on a substrate, and there is no other structure added around the antenna radiation unit. In an E-plane direction of the antenna, the pattern is easily affected by surface waves, resulting in large jitter.

Based on this, the present disclosure provides a design for optimizing a jitter of a millimeter wave radar antenna pattern, which can suppress an influence of surface waves on the pattern to a certain extent, reduce the jitter of the antenna pattern, thereby improving a performance of a millimeter wave radar system.

As shown in FIG. 1, an onboard antenna provided in an exemplary embodiment of the present disclosure includes a dielectric substrate 1, an antenna 2 and a metal block 3. The antenna 2 is located on the dielectric substrate 1, a projection of the metal block 3 on a plane where the dielectric substrate 1 is located is not overlapped with a projection of the antenna 2 on the plane, the metal block 3 is located on the dielectric substrate 1 in a polarization direction of the antenna 2, and a distance between a metal edge of the metal block 3 close to a side of the antenna and the antenna is greater than a coupling threshold, which is used to suppress surface waves generated by the antenna 2 on the dielectric substrate 1.

In an embodiment, the dielectric substrate 1 includes a first substrate edge, a second substrate edge, a third substrate edge and a fourth substrate edge; wherein the first substrate edge is one edge of the dielectric substrate 1 in the polarization direction, the second substrate edge is another edge of the dielectric substrate 1 in the polarization direction, the third substrate edge is an edge intersecting with the first substrate edge, and the fourth substrate edge and the third substrate edge are opposite edges.

In the embodiment of the present disclosure, the polarization direction can be considered as a direction of an electric field strength formed when the antenna 2 radiates electromagnetic waves. The edge in the polarization direction can be considered as an edge perpendicular to the polarization direction. The edge can be straight. The first substrate edge, the second substrate edge, the third substrate edge and the fourth substrate edge can be formed into a rectangle. The first substrate edge, the second substrate edge, the third substrate edge and the fourth substrate edge are boundaries of the dielectric substrate 1. The dielectric substrate 1 taken as a rectangle is illustrated in the embodiment of the present disclosure, but in other exemplary implementations, the dielectric substrate 1 can be in any shape such as a circle, an ellipse, a rounded rectangle or the like.

In designing the dimension of the metal block 3 in the present disclosure, it is only necessary that the metal blocks 3 are arranged in the polarization direction of the antenna 2 on the dielectric substrate 1. As seen from a perspective in FIG. 1, a length of the metal block 3 in an extension direction is greater than a length of the antenna 2 in the extension direction. The extension direction is perpendicular to the polarization direction. From the perspective in FIG. 1, the extension direction can be left-right direction, and the polarization direction can be up-down direction.

In the embodiment of the present disclosure, it can be considered that there is an isolator between the metal block 3 and the antenna 2, and the isolator is determined based on the coupling threshold between the metal block 3 and the antenna 2. A white area around the antenna 2 in FIG. 1 can be considered as an isolator.

In an embodiment, the metal block 3 is in an annular structure or semi-enclosed structure formed around the isolator and based on the restriction of edges of the dielectric substrate 1.

When the metal block 3 is in the annular structure, it can be considered that the periphery of the antenna 2 is completely surrounded by the metal block 3. As shown in FIG. 1, the metal block 3 is arranged in an annular structure on the periphery of the antenna 2.

In an embodiment, a contour of the metal block 3 on a side close to the antenna 2 can be in a contour structure formed along a contour of the antenna 2.

In an embodiment, a part of a metal edge of the metal block 3 on a side close to the antenna 2 can be straight, a contour of a part of the metal edge can be in a contour structure formed along the contour of the antenna 2. For example, in the metal edge on the side close to the antenna 2 in FIG. 1, a metal edge located on an upper side of the antenna 2 is set to be straight, or a part of the metal edge located on the upper side of the antenna 2 is set to be straight.

When the metal block 3 is in a semi-enclosed structure, it can be considered that the antenna 2 is not completely enclosed by the metal block 3. When the metal block 3 is in a semi-enclosed structure, the contour on a side close to the antenna 2 can be straight or can be in a contour structure formed along the contour of the antenna 2.

In an embodiment, the metal block 3 can be arranged on the dielectric substrate 1, one metal block 3 can correspond to one isolator, the metal block 3 and the corresponding isolator can be located on a same side of the antenna 2, and the metal block 3 can be located between the corresponding isolator and a corresponding edge of the dielectric substrate 1. The corresponding edge of the dielectric substrate 1 and the metal block 3 can be located on the same side of the antenna 2.

In an embodiment, the isolator is in a groove structure or a barrier structure formed by the metal block 3, the antenna 2 and the dielectric substrate 1.

In an embodiment, the contour of the metal block 3 includes any of the following contour parts: a contour part formed along the contour shape of the antenna 2, or a contour part determined based on a decoupling distance (also referred as a coupling threshold) between a radiation edge of the contour of the antenna 2 and the metal block 3. For example, the metal block 3 is arranged outside a range of the coupling threshold of the contour of the antenna, and the contour of the metal block 3 is formed along the contour of the antenna 2.

In an embodiment, the metal block 3 includes at least two independent block structures, wherein each block structure is arranged around the antenna 2 and the isolator is between the block structure and the antenna 2. The block structure includes, but is not limited to, a first metal block, a second metal block, a third metal block, and a fourth metal block. A second isolator is arranged between a plurality of block structures based on a decoupling distance between the block structures. The second isolator is in a groove structure or a barrier structure formed by an adjacent block structure and the dielectric substrate.

In an embodiment, a length or width of each of the block structures is not less than a length or width of the antenna 2.

As shown in FIG. 1, FIG. 3, FIG. 7, FIG. 8 or FIG. 9, the lengths of the block structure on the left and right are not less than lengths of the antenna 2 on the left and right. As shown in FIG. 10, the antenna 2 is horizontally polarized, and a surface wave 2-1 excited on the substrate propagates like a ripple. The influence of the surface wave on the pattern can be suppressed to a certain extent by providing the block structure. Due to the strongest surface wave in a range of length W of the antenna on the left and right, the influence of the surface wave on the pattern can be suppressed to the maximum extent by making the length of the added block structure greater than the length of the antenna, and then the antenna pattern can be optimized to the maximum extent.

Figure 11:
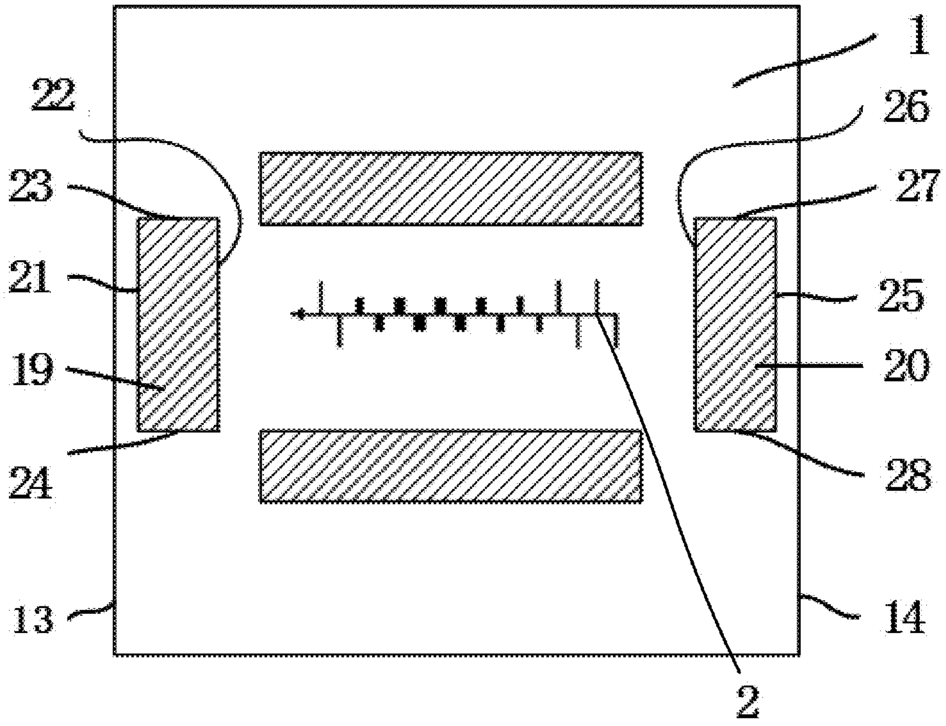
FIG. 11 is a schematic diagram of a structure of yet another onboard antenna provided in an exemplary embodiment of the present disclosure.

In an embodiment, the antenna 2 is an array antenna, and there is an isolator between the metal block 3 and an overall contour of the array antenna. As shown in FIG. 11, upper and lower lengths of the block structures 19, 20 are not less than upper and lower lengths of the antenna 2. If the antenna 2 is an array antenna, the upper and lower lengths of the block structures 19 and 20 are not less than total upper and lower lengths of the array antenna, respectively.

The antenna 2 is configured to radiate or receive electromagnetic waves which are formed by an electric field and a magnetic field, and a type of the antenna 2 is not limited, such as a comb antenna, a planar antenna, or the like. The polarization direction can be considered as a direction of an electric field intensity formed when the antenna 2 radiates electromagnetic waves. A thickness of the metal block 3 is the same as or nearly the same as a thickness of the antenna 2, and the thickness of the metal block 3 and the antenna 2 in the present disclosure is nearly the same, meaning that a difference between the thickness of the metal block 3 and the thickness of the antenna 2 is within a preset error range. In a process, the metal block 3 and the antenna 2 are usually etched on a complete rectangular metal, that is, the metal block 3 and the antenna 2 are processed integrally. Therefore, the thickness of the metal block 3 is usually the same as the thickness of the antenna 2. In the present disclosure, a material of the metal block 3 is not limited. In the present disclosure, the metal block 3 can be a metal layer arranged on the dielectric substrate 1, which is higher than a surface of the dielectric substrate 1. That is, a surface where the metal block 3 is located is convex to the surface of the dielectric substrate 1. Alternatively, the metal layer can be a metal layer arranged on the surface of the dielectric substrate 1, which is lower than the surface of the dielectric substrate 1. That is, the surface of the metal block 3 is concave to the surface of the dielectric substrate 1.

The antenna 2 in the present disclosure can be a comb antenna, the surface wave is generated at an interface between the dielectric substrate 1 and the comb antenna. A surface current propagates along the surface of the dielectric substrate 1. By adding the metal block 3, the surface where the metal block 3 is located and the surface where the antenna 2 is located can be the same surface, which can cut off the surface current, thereby reducing radiation of the surface wave at the edge of the dielectric substrate 1 and further reducing the influence of the surface wave on the antenna pattern.

It should be understood that there is a certain space between the metal block 3 and the antenna 2, that is, there is an isolator, so that the metal block 3 is not as close as possible to the antenna 2. If the metal block 3 is extremely close to the antenna 2, the metal block 3 can be coupled with the antenna 2, which affects the radiation of the antenna 2 itself. Therefore, it is necessary to make a certain distance between the metal block 3 and the antenna 2, that is, the projection of the metal block 3 on the plane where the dielectric substrate 1 is located is not overlapped with the projection of the antenna 2 on the plane, and the distance between the metal edge of the metal block 3 on the side close to the antenna and the antenna 2 is greater than the coupling threshold. In this embodiment, the coupling distance can be determined according to practical situations, for example, according to the performance of the antenna 2. If the metal block 3 is arranged within the coupling distance, the metal block 3 would be coupled with the antenna 2.

In an embodiment, a metal layer can be laid on the dielectric substrate 1, and then the antenna 2 is etched out, and the remaining metal layer etched can be considered as the metal block 3. The distances between the metal block 3 and the antenna 2 can be even or uneven. For example, a shape of the metal block 3 on the side close to the antenna 2 can be determined based on a shape of the antenna 2, or can be straight.

In this embodiment, a dimension, a quantity and a position of the metal blocks 3 are determined by the metal blocks 3 which are arranged around the antenna 2 and can effectively suppress the influence of surface waves on the pattern.

For example, one metal block 3 can be arranged in the polarization direction of the antenna 2, and the length of the metal block 3 (in a left-right direction) is greater than or equal to the length of the antenna 2. Alternatively, one metal block 3 may be respectively arranged on both edges (upper and bottom edges) of the antenna 2 in the polarization direction, and upper and lower edges of the metal block 3 can extend to the upper and bottom edges of the dielectric substrate 1, and/or the left and right edges of the metal block 3 can extend to the left and right edges of the dielectric substrate 1. Alternatively, four metal block 3 can be arranged around the antenna 2 (on upper, bottom, left and right sides of the antenna 2), respectively.

The left, right, upper and bottom described in the embodiment of the present disclosure can be considered for the perspective shown in FIG. 1. The antenna 2 can be considered as a reference for the left, right, upper and bottom. The left can be considered as the left side of the antenna 2 on the dielectric substrate 1, the right can be considered as the right side of the antenna 2 on the dielectric substrate 1, the upper can be considered as the upper side of the antenna 2 on the dielectric substrate 1, and the bottom can be considered as the lower side of the antenna 2 on the dielectric substrate 1.

Figure 3:
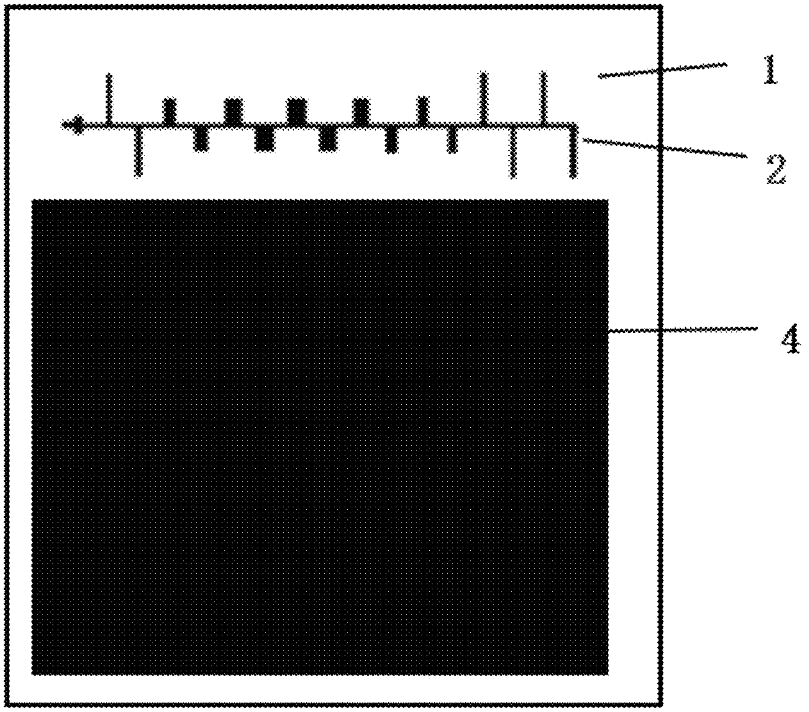
FIG. 3 is a schematic diagram of a structure of another onboard antenna provided in an exemplary embodiment of the present disclosure.

For example, FIG. 3 is a schematic diagram of a structure of another onboard antenna provided in an exemplary embodiment of the present disclosure. As shown in FIG. 3, one metal block 4 is arranged in the polarization direction of the antenna 2, the antenna 2 is located on the dielectric substrate 1, a projection of the metal block 4 on the plane where the dielectric substrate 1 is located is not overlapped with the projection of the antenna 2 on the plane, and the metal block 4 is located on the dielectric substrate 1 in the polarization direction of the antenna 2. The metal block 4 shown in FIG. 3 can be considered as in a semi-enclosed structure. In FIG. 3, a space between the antenna 2 and the metal block 4 can be considered as an isolator.

It should be understood that, due to the high frequency of millimeter waves, surface waves are easily generated at the interface between the antenna and the dielectric substrate. A surface current of the surface wave propagates along the surface of the dielectric substrate to the edges of the dielectric substrate, resulting in the jitter of the antenna pattern. In the present exemplary embodiment, a propagating surface current can be cut off by arranging a metal block in the polarization direction of the antenna, thereby reducing the radiation of surface waves at the edges of the dielectric substrate, thereby reducing the influence of the surface waves on the antenna pattern, so that the jitter of the antenna pattern is improved.

Figure 4:
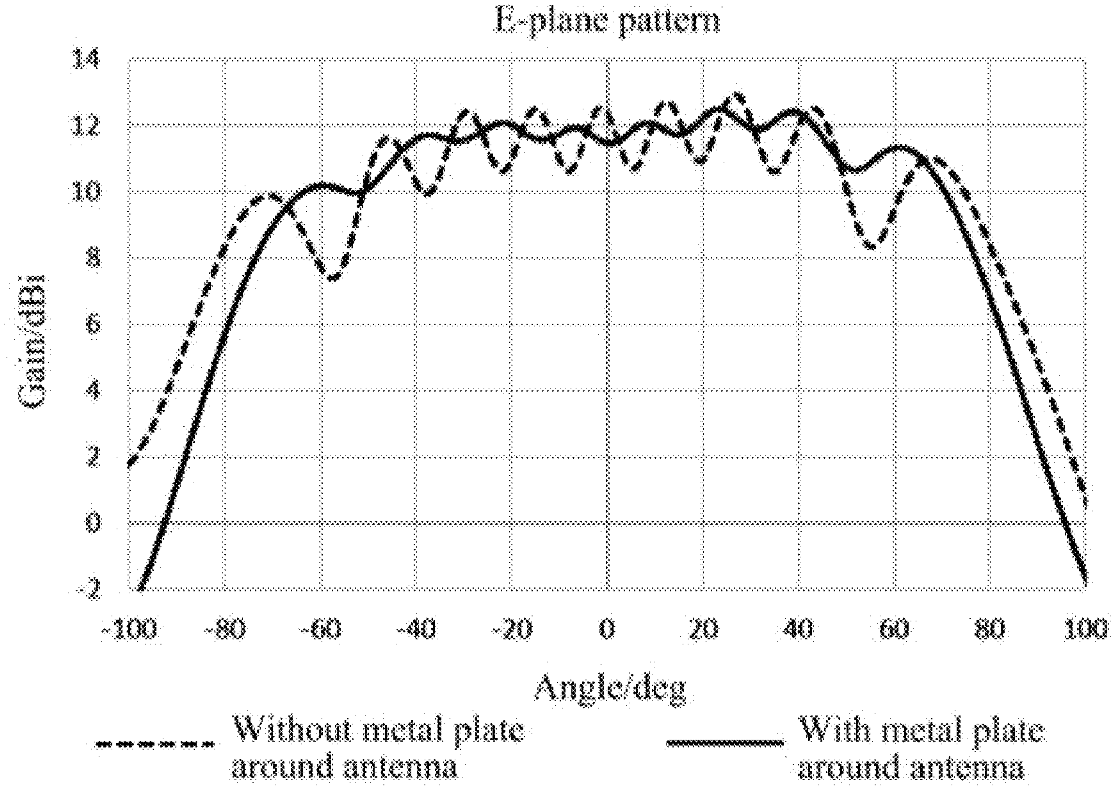
FIG. 4 is an E-plane pattern with or without a metal block around an antenna provided in an exemplary embodiment of the present disclosure.

FIG. 4 is an E-plane pattern with or without a metal block around an antenna provided in an exemplary embodiment of the present disclosure. As shown in FIG. 4, after the metal block, i.e. a metal plate, is added around the antenna, the jitter of the E-plane pattern is obviously reduced, a curve is smoother, and a depression of the pattern near a large angle, i.e. ±58 degrees, is obviously improved.

Figure 5:
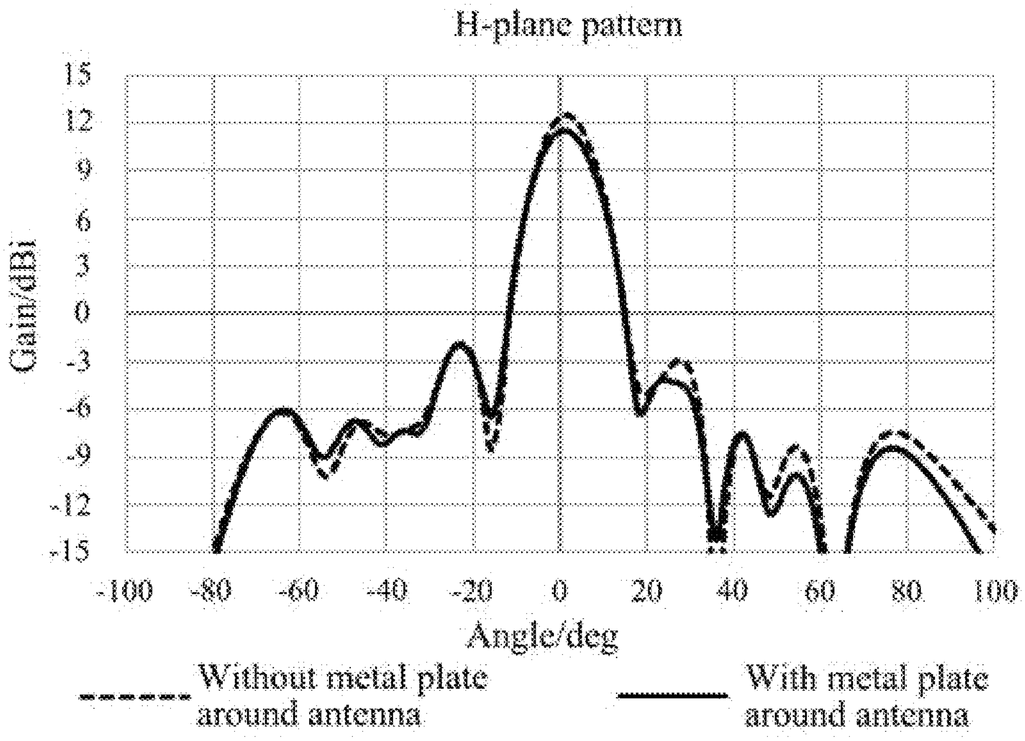
FIG. 5 is an H-plane pattern with or without a metal block around an antenna provided in an exemplary embodiment of the present disclosure.
Figure 6:
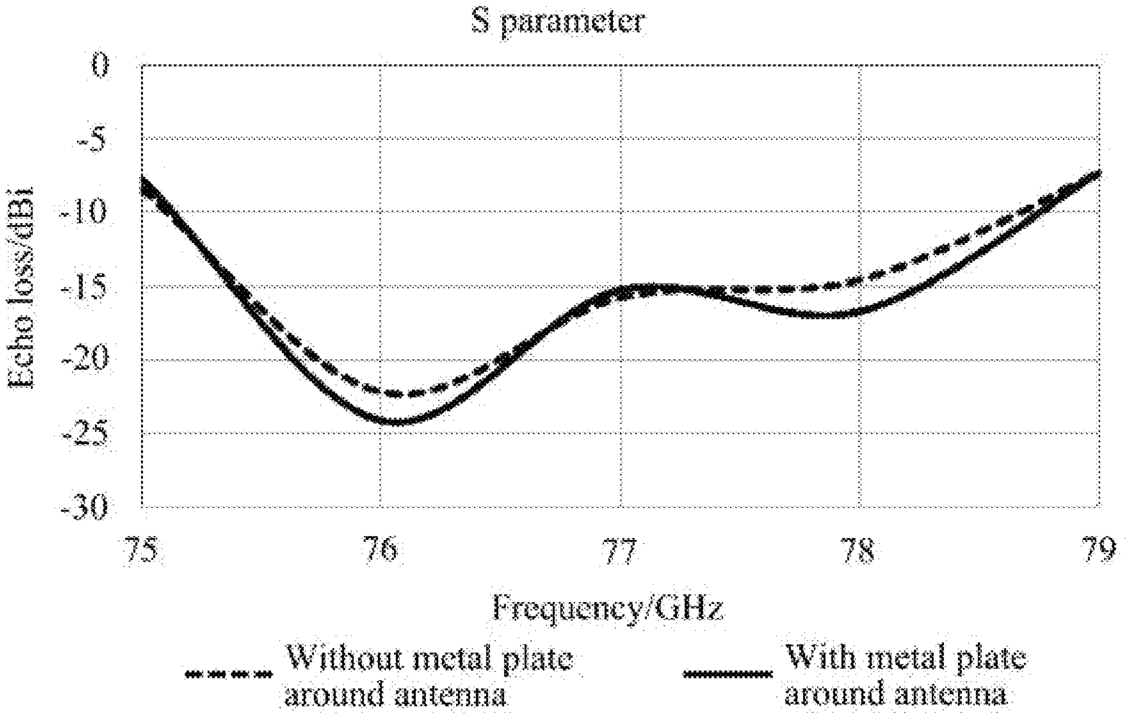
FIG. 6 is a graph showing a comparison of return loss coefficients with or without metal blocks around the antenna provided in an exemplary embodiment of the present disclosure.

FIG. 5 is an H-plane pattern with or without a metal block around an antenna provided in an exemplary embodiment of the present disclosure. FIG. 6 is a graph showing a comparison of return loss coefficients with or without metal blocks around the antenna provided in an exemplary embodiment of the present disclosure. As can be seen from FIGS. 5 and 6, the H-plane pattern and a return loss of the antenna are not deteriorated, but are slightly improved after the metal block is added around the antenna, so it can be considered that there is almost no influence. Combined with the results of the E-plane pattern in FIG. 4, it can be seen that the jitter of the E-plane pattern is obviously improved after adding the metal block around the antenna, while other performance of the antenna is not affected.

Overall, through several simulations and tests, the effect of reducing the jitter of the pattern is obvious when the metal block is added around the antenna, and other performances of the antenna do not deteriorate, and then the overall performance of the antenna is improved. In the graphs showing the effect in FIGS. 4 to 6, adding metal blocks around the antenna means to cover the periphery of the antenna with a metal layer, and it can be considered to have a set distance from the antenna at the periphery of the antenna and surrounding the antenna.

Based on the above-mentioned embodiments, a modified embodiment of the above-mentioned embodiments is proposed, in which only differences from the above-mentioned embodiments are described in order to make the description brief.

Figure 7:
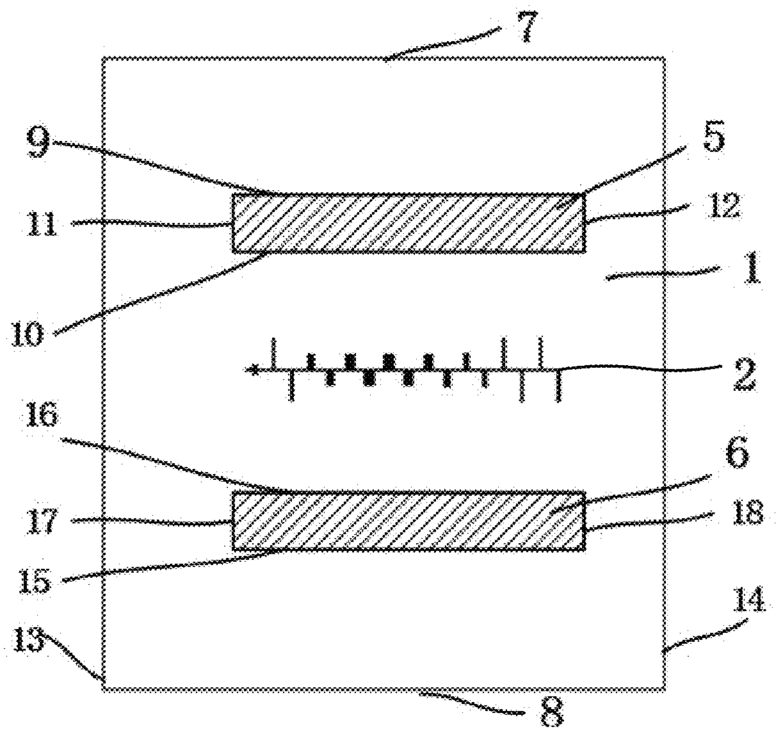
FIG. 7 is a schematic diagram of a structure of yet another onboard antenna provided in an exemplary embodiment of the present disclosure.

In an embodiment, FIG. 7 is a schematic diagram of a structure of yet another onboard antenna provided in an exemplary embodiment of the present disclosure. As shown in FIG. 7, the metal block includes a first metal block 5 and/or a second metal block 6, wherein the first metal block 5 is located between a first substrate edge 7 of the dielectric substrate 1 and the antenna 2, and the second metal block 6 is located between a second substrate edge 8 of the dielectric substrate 1 and the antenna 2.

The first substrate edge 7 can be considered as an edge of the dielectric substrate 1 in the polarization direction, and the second substrate edge 8 can be considered as another edge of the dielectric substrate 1 in the polarization direction. Dimensions of the first metal block 5 and the second metal block 6 in this embodiment can be determined according to the dimensions of the antenna 2.

In an embodiment, a first metal edge 9 of the first metal block 5 away from the antenna 2 is apart from the first substrate edge 7 by a first set value, the antenna 2 is apart from a second metal edge 10 of the first metal block 5 by a second set value, the first metal edge 9 of the first metal block 5 and the second metal edge 10 of the first metal block 5 are opposite edges, and the second set value is greater than the coupling threshold.

The first metal edge 9 of the first metal block 5 can be perpendicular to the polarization direction.

In an embodiment, a third metal edge 11 of the first metal block 5 is apart from a third substrate edge 13 of the dielectric substrate 1 by a third set value, a fourth metal edge 12 of the first metal block 5 is apart from a fourth substrate edge 14 of the dielectric substrate 1 by a fourth set value, and the third metal edge 11 of the first metal block 5 and the fourth metal edge 12 of the first metal block 5 are opposite edges. The first set value, the third set value and the fourth set value can be 0 or any value, wherein the any value can be determined according to the dimensions of the dielectric substrate 1 and the antenna 2.

It should be understood that, in a top view, both of the first metal block 5 and the second metal block 6 are composed of four metal edges, and the metal edges can be considered as edges that forms the metal blocks. The four metal edges can include a first metal edge, a second metal edge, a third metal edge and a fourth metal edge, wherein the first metal edge is perpendicular to the polarization direction, the first metal edge and the second metal edge are opposite edges, the third metal edge and the fourth metal edge are opposite edges, and the first metal edge is perpendicular to the third metal edge. For example, as shown in FIG. 7, the first metal edge 9 of the first metal block 5 can be a metal edge of the first metal block 5 on an upper side, the second metal edge 10 can be a metal edge of the first metal block 5 on a bottom side, the third metal edge 11 can be a metal edge of the first metal block 5 on the left side, and the fourth metal edge 12 can be a metal edge of the first metal block 5 on the right side.

The first set value, the second set value, the third set value and the fourth set value are only used to distinguish different objects, and can be set by relevant personnel. The first set value, the second set value, the third set value and the fourth set value can be the same or different, and the first set value, the second set value, the third set value and the fourth set value in this embodiment can be determined based on a practical scene.

The third substrate edge 13 can be considered as an edge of the dielectric substrate 1 in the extending direction of the antenna 2, the fourth substrate edge 14 can be considered as another edge of the dielectric substrate 1 in the extending direction of the antenna 2, and the extending direction is perpendicular to the polarization direction.

In an embodiment of the present disclosure, the edges in the extending direction of the antenna can be considered as the edges perpendicular to the extending direction of the antenna. As shown in FIG. 7, the extending direction of the antenna is the left-right direction in the figure and the third substrate edge 13 and the fourth substrate edge 14 are two edges of the dielectric substrate 1 which are opposite to each other in the vertical direction.

The first metal edge 9 of the first metal block 5 is perpendicular to the third metal edge 11 of the first metal block 5. The third substrate edge 13 is an edge of the dielectric substrate 1 in the extending direction of the antenna 2, the fourth substrate edge 14 is another edge of the dielectric substrate 1 in the extending direction of the antenna 2, and the extending direction is perpendicular to the polarization direction.

In an embodiment, a first metal edge 15 of the second metal block 6 away from the antenna 2 is apart from the second substrate edge 8 by a fifth set value, the antenna 2 is apart from a second metal edge 16 of the second metal block 6 by a sixth set value, the first metal edge 15 of the second metal block 6 and the second metal edge 16 of the second metal block 6 are opposite edges, and the sixth set value is greater than the coupling threshold.

In an embodiment, a third metal edge 17 of the second metal block 6 is apart from the third substrate edge 13 by a seventh set value, a fourth metal edge 18 of the second metal block 6 is apart from the fourth substrate edge 14 by an eighth set value, and the third metal edge 17 of the second metal block 6 and the fourth metal edge 18 of the second metal block 6 are opposite edges. The fifth set value, the seventh set value, and the eighth set value can be 0 or any value, and the any value can be determined according to the dimensions of the dielectric substrate 1 and the antenna 2.

The fifth set value, the sixth set value, the seventh set value and the eighth set value are also only used to distinguish different objects, and can be set by relevant personnel. The fifth set value, the sixth set value, the seventh set value and the eighth set value in this embodiment can be determined according to a practical scene.

The second metal edge 16 of the second metal block 6 can be perpendicular to the polarization direction, and the first metal edge 15 of the second metal block 6 can be perpendicular to the third metal edge 17 of the second metal block 6.

Figure 8:
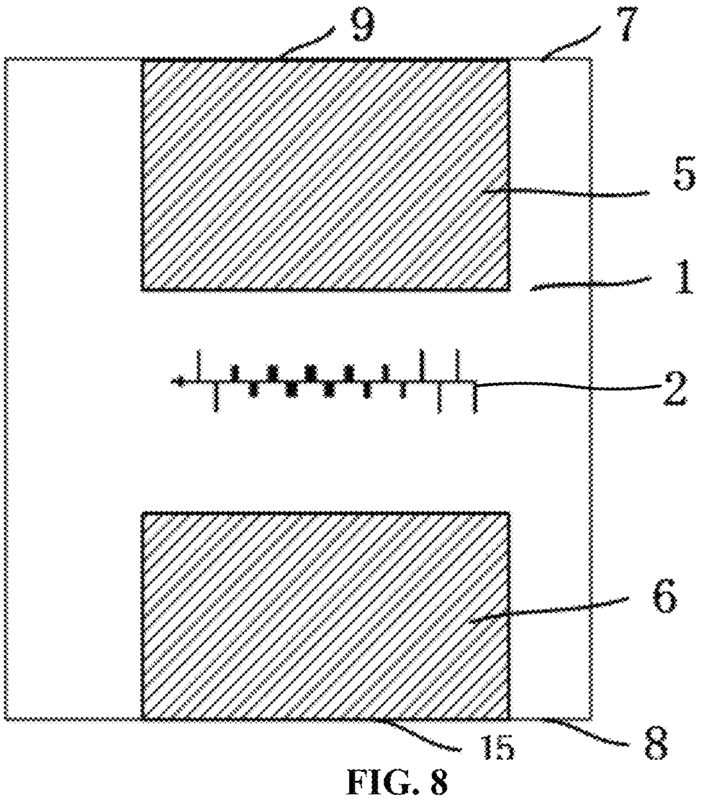
FIG. 8 is a schematic diagram of a structure of yet another onboard antenna provided in an exemplary embodiment of the present disclosure.

FIG. 8 is a schematic diagram of a structure of yet another onboard antenna provided in an exemplary embodiment of the present disclosure. As shown in FIG. 8, the first metal edge 9 of the first metal block 5 can extend to the first substrate edge 7, and the first metal edge 15 of the second metal block 6 can extend to the second substrate edge 8. In this embodiment, the lengths of the first metal block 5 and the second metal block 6 in the extension direction can be equal to the length of the antenna in the extension direction, or can be greater than the length of the antenna in the extension direction.

Figure 9:
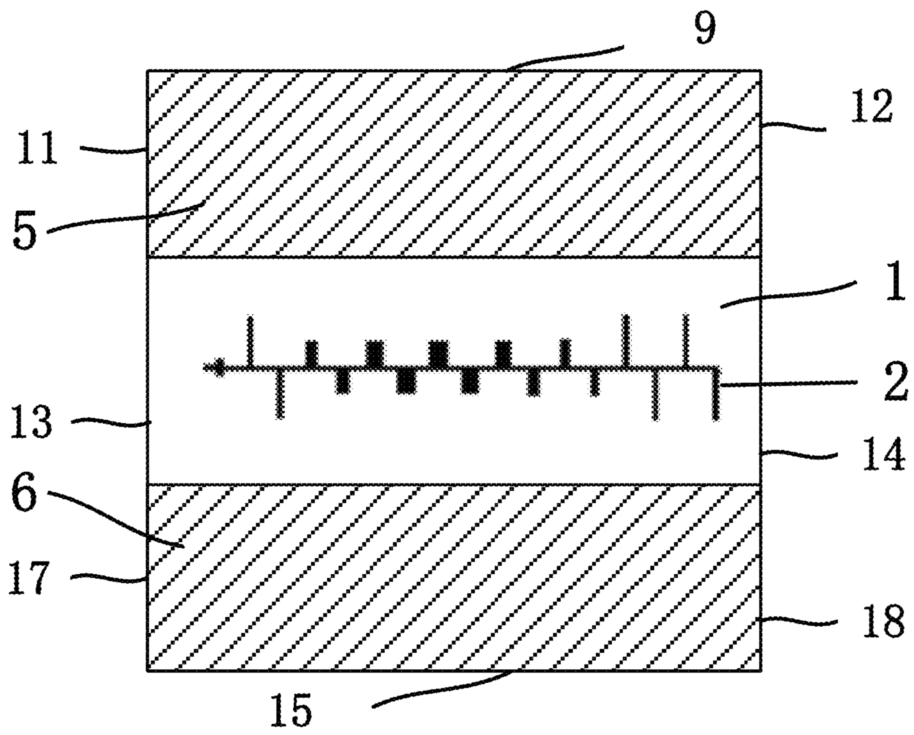
FIG. 9 is a schematic diagram of a structure of yet another onboard antenna provided in an exemplary embodiment of the present disclosure.
Figure 10:
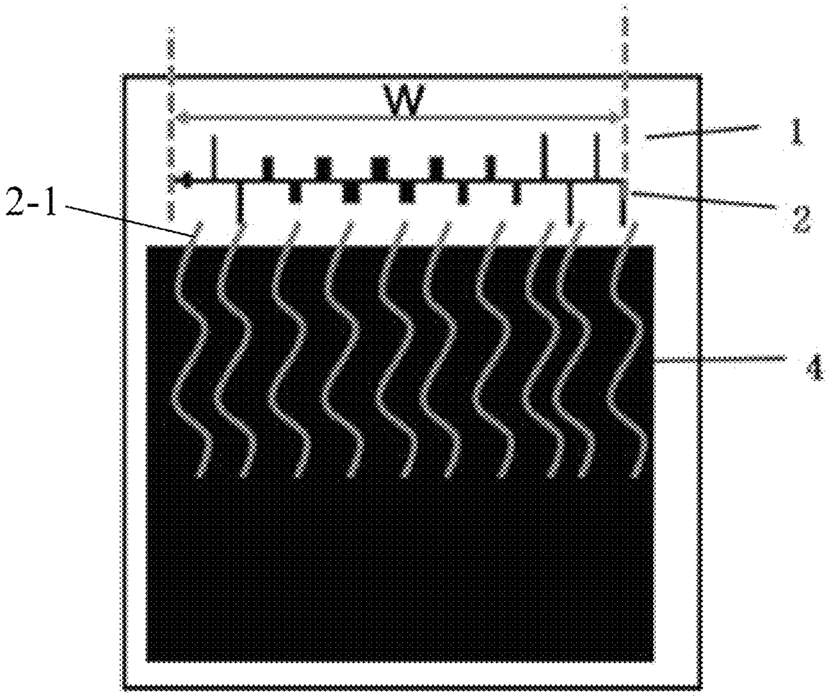
FIG. 10 is a schematic diagram of a surface wave propagation direction of an onboard antenna provided in an exemplary embodiment of the present disclosure.

FIG. 9 is a schematic diagram of a structure of yet another onboard antenna provided in an exemplary embodiment of the present disclosure. As shown in FIG. 9, the first metal edge 9 of the first metal block 5 can extend to the first substrate edge, the first metal edge 15 of the second metal block 6 can extend to the second substrate edge. In addition, the third metal edges 11 and 17 of the first metal block 5 and the second metal block 6 can extend to the third substrate edge 13, and the fourth metal edges 12 and 18 of the first metal block 5 and the second metal block 6 can extend to the fourth substrate edge 14. The first metal block 5 and the second metal block 6 shown in FIG. 9 can be considered as in semi-enclosed structures.

In an embodiment, FIG. 11 is a schematic diagram of a structure of yet another onboard antenna provided in an exemplary embodiment of the present disclosure. As shown in FIG. 11, the metal block further includes a third metal block 19 and/or a fourth metal block 20, wherein the third metal block 19 is located between the third substrate edge 13 of the dielectric substrate 1 and the antenna 2, and the fourth metal block 20 is located between the fourth substrate edge 14 of the dielectric substrate 1 and the antenna 2.

Dimensions, positions and materials of the third metal block 19 and the fourth metal block 20 are not limited. The dimensions of the third metal block 19 and the fourth metal block 20 can be the same as those of the first metal block 5 and the second metal block 6 or different from those of the first metal block 5 and the second metal block 6. The dimensions of the third metal block 19 and the fourth metal block 20 can be the same or different.

For example, a first metal edge 21 of the third metal block 19 can extend to the third substrate edge 13, a fourth metal edge 28 of the fourth metal block 20 can also extend to the second substrate edge 8, and a third metal edge 23 of the third metal block 19, the second metal edge 10 of the first metal block 5 and a third metal edge 27 of the fourth metal block 20 can also be in a straight line, etc.

In an embodiment, the first metal edge 21 of the third metal block 19 is apart from the third substrate edge 13 by a ninth set value, the antenna 2 is apart from a second metal edge 22 of the third metal block 19 by a tenth set value, the first metal edge 21 of the third metal block 19 and the second metal edge 22 of the third metal block 19 are opposite edges, and the tenth set value is greater than the coupling threshold.

The first metal edge 21 of the third metal block 19 can be parallel to the polarization direction.

In an embodiment, a first metal edge 25 of the fourth metal block 20 is apart from the fourth substrate edge 14 by an eleventh set value, the antenna 2 is apart from a second metal edge 26 of the fourth metal block 20 by a twelfth set value, the first metal edge 25 of the fourth metal block 20 and the second metal edge 26 of the fourth metal block 20 are opposite edges, and the twelfth set value is greater than the coupling threshold.

The first metal edge 25 of the fourth metal block 20 is parallel to the polarization direction.

In an embodiment, the third metal edge 23 of the third metal block 19 and/or the third metal edge 27 of the fourth metal block 20 are located on an extension line of the second metal edge 10 of the first metal block 5, and the first metal edge 21 of the third metal block 19 is connected to the third metal edge 23 of the third metal block 19.

In an embodiment, the fourth metal edge 24 of the third metal block 19 and/or the fourth metal edge 28 of the fourth metal block 20 are located on an extension line of the second metal edge 16 of the second metal block 6, the third metal edge 23 of the third metal block 19 and the fourth metal edge 24 of the third metal block 19 are opposite edges, and the third metal edge 27 of the fourth metal block 20 and the fourth metal edge 28 of the fourth metal block 20 are opposite edges.

The ninth set value, the tenth set value, the eleventh set value and the twelfth set value are also only used to distinguish different objects, and can be set by relevant personnel. The ninth set value, the tenth set value, the eleventh set value and the twelfth set value in this embodiment can be determined according to a practical scene. The ninth set value and the eleventh set value can be 0 or any value, and a value of the any value can be determined according to the dimensions of the dielectric substrate 1 and the antenna 2.

The set values in the embodiments of the present disclosure, such as the values of the first set values to the twelfth set values, can be determined according to the performance of the onboard antenna and the application scene.

The first metal edge 25 of the fourth metal block 20 is connected to the third metal edge 27 of the fourth metal block 20.

Figure 12:
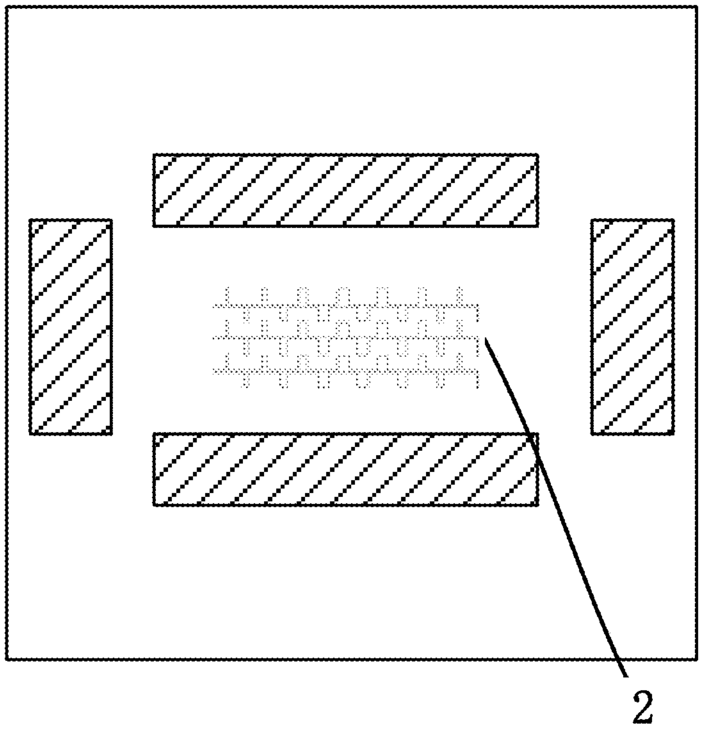
FIG. 12 is a schematic diagram of a structure of yet another onboard antenna provided in an exemplary embodiment of the present disclosure.

FIG. 12 is a schematic diagram of a structure of yet another onboard antenna provided in an exemplary embodiment of the present disclosure, wherein the antenna 2 shown in FIG. 12 is an array antenna. A metal block is arranged on the periphery of the antenna 2.

All of the metal blocks in FIGS. 3, 7, 8, 9, 11 and 12 of the present disclosure are in rectangular structures, and in other exemplary implementations, the metal blocks can be in any other shape such as an ellipse, a rounded rectangle or the like. In this case, the length of the metal block in the extension direction is equal to a distance from the leftmost point on the metal block to the rightmost point on the metal block.

Figure 13:
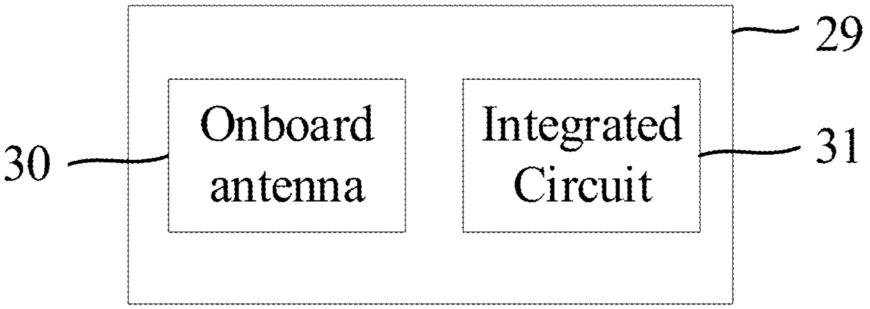
FIG. 13 is a schematic diagram of a structure of a radio equipment provided in an exemplary embodiment of the present disclosure.

A radio equipment is further provided in an embodiment of the present disclosure. FIG. 13 is a schematic diagram of a structure of a radio equipment provided in an exemplary embodiment of the present disclosure. Referring to FIG. 13, a radio equipment 29 includes an onboard antenna 30 as described in any embodiment of the present disclosure and an integrated circuit 31, the integrated circuit 31 can transmit and/or receive radio signals through the onboard antenna, to achieve target detection and/or communication.

The integrated circuit 31 can include an analog signal processing circuit and a digital signal processing module.

The analog signal processing circuit is connected to the onboard antenna, and includes a signal transmitter and a signal receiver. The signal transmitter generates a detection electrical signal, a frequency of which is continuously changed, and the signal transmitter feeds the detection electrical signal to the onboard antenna to transmit a detection signal wave. The signal receiver converts an echo signal wave corresponding to the detection signal wave into an echo electrical signal at a baseband. The echo signal wave is obtained when the detection signal wave is reflected by an object and received by the onboard antenna. The analog signal processing circuit further includes an AD converter to convert the echo electrical signal into a corresponding echo digital signal.

The digital signal processing module is coupled with the analog signal processing circuit. The digital signal processing module is configured to perform signal processing on the echo digital signal to output a digital signal that can be processed by a subsequent circuit. The digital signal is obtained by the processing module to provide matrix data for at least one of a relative distance, a relative velocity, a relative angle, an object profile, etc. between the radio equipment and the object.

In an embodiment, alternatively, the above-mentioned integrated circuit 31 can be a millimeter wave radar chip. The type of digital signal processing module in the integrated circuit 31 can be determined according to practical requirements. For example, in the millimeter wave radar chip, the digital signal processing module includes an FPGA (or a DSP) and other circuit equipments. For example, the signal processing module performs at least one signal processing including 1-FFT, 2-FFT, arrival calculation, etc. on the echo digital signal, and processes a plurality of calculated echo digital signals corresponding to at least one detection signal wave into one frame of matrix data and outputs it.

Alternatively, the radio equipment includes a radar sensor, such as a millimeter wave radar sensor.

Figure 14:
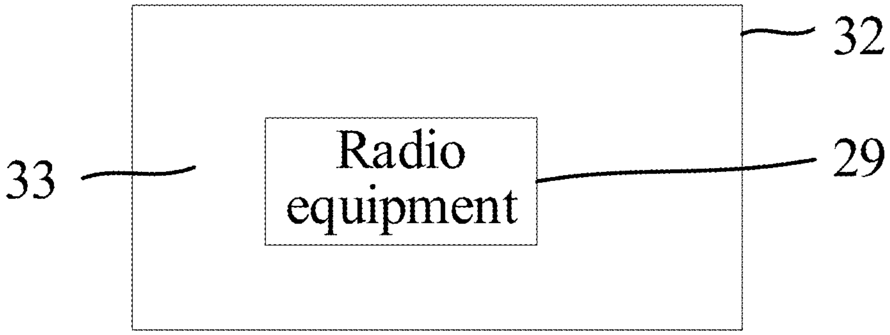
FIG. 14 is a schematic diagram of a structure of an electronic device provided in an exemplary embodiment of the present disclosure.

An electronic device is further provided in an embodiment of the present disclosure. FIG. 14 is a schematic diagram of an structure of an electronic device provided in an exemplary embodiment of the present disclosure. Referring to FIG. 14, an electronic device 32 includes a device body 33 and a radio equipment 29 arranged on the device body 33 as described in any embodiment of the present disclosure. The radio equipment 29 is configured to perform target detection and/or communication to provide reference information for operation of the device body 33 in the electronic device 32. The reference information can be considered as information required for the operation of the device body 33 in the electronic device 32, such as detection target information at the time of target detection, i.e. information required for detecting a target, and communication information, i.e. information required for internal communication or external communication of the electronic device 32.

In an embodiment of the present disclosure, the radio equipment 29 can be arranged outside the device body 33. In another embodiment of the present disclosure, the radio equipment 29 can also be arranged inside the device body 33. In other embodiments of the present disclosure, the radio equipment 29 can also be arranged partly inside the device body 33 and partly outside the device body 33, and the arranged location thereof depends on the situation.

In an alternative embodiment, the device body 33 can be components and products applied to fields such as intelligent residences, transportation, smart homes, consumer electronics, monitoring, industrial automation, in-cabin detection, and health care. For example, the device body 33 may also be an intelligent transportation device (such as automobiles, bicycles, motorcycles, ships, subways, trains, etc.), security device (such as cameras), liquid level/flow rate detection device, smart wearable devices (such as bracelets, glasses, etc.), smart home device (such as sweeping robots, door locks, TV sets, air conditioners, smart lights, etc.), various communication devices (such as mobile phones, tablet computers, etc.), as well as road gates, intelligent traffic lights, intelligent signs, traffic cameras and various industrial mechanical arms (or robots), etc. The device body 33 can also be various instruments for detecting life characteristic parameters and various devices equipped with the instruments, such as automobile in-cabin detection, indoor personnel monitoring, intelligent medical device, etc.

The radio equipment 29 may be the radio equipment 29 described in any of the embodiments of the present disclosure and the structure and operating principle of the radio equipment 29 have been described in detail in the above-mentioned embodiments and are not described here.

The radio equipment 29 may perform functions such as target detection and/or communication by transmitting and receiving radio signals, to provide detection target information and/or communication information to the device body 33, thereby aiding or even controlling the operation of the device body 33.

For example, when the above-mentioned device body 33 is applied to an Advanced Driving Assistance System (ADAS), the radio equipment 29 (such as a millimeter wave radar) as an onboard sensor can provide various functional safety guarantees for the ADAS system, such as Automatic Brake Assist (AEB), Blind Spot Detection (BSD), Lane Change Assisting Warning (LCA), Reversing Assisting Warning (RCTA) and the like.

It should be noted that the above are only exemplary embodiments of the present disclosure and the technical principles employed. It should be understood by those skilled in the art that the present disclosure is not limited to the exemplary embodiments described herein and that various significant changes readjustments and substitutions can be made to those skilled in the art without departing from the protection scope of the present disclosure. Therefore, although the present disclosure has been described in more detail by the above embodiments, the present disclosure is not limited to the above embodiments, but may include more other equivalent embodiments without departing from the concept of the present disclosure, and the scope of the present disclosure is determined by the scope of the appended claims.

The invention claimed is:

1. An onboard antenna, comprising a dielectric substrate, an antenna, and a metal block;

the antenna being located on the dielectric substrate, a projection of the metal block on a plane where the dielectric substrate is located being not overlapped with a projection of the antenna on the plane where the dielectric substrate is located, the metal block being located on the dielectric substrate in a polarization direction of the antenna, and a distance between a metal edge of the metal block on a side close to the antenna and the antenna being greater than a coupling threshold;

wherein there is an isolator between the metal block and the antenna, wherein the dielectric substrate comprises a first substrate edge, a second substrate edge, a third substrate edge and a fourth substrate edge; wherein the first substrate edge is one edge of the dielectric substrate in the polarization direction, the second substrate edge is another edge of the dielectric substrate in the polarization direction, the third substrate edge is an edge intersecting with the first substrate edge, and the fourth substrate edge and the third substrate edge are opposite edges, wherein the metal block comprises a first metal block and a second metal block, wherein the first metal block is located between the first substrate edge of the dielectric substrate and the antenna, and the second metal block is located between the second substrate edge of the dielectric substrate and the antenna, wherein the metal block further comprises a third metal block and a fourth metal block, wherein the third metal block is located between the third substrate edge of the dielectric substrate and the antenna, and the fourth metal block is located between the fourth substrate edge of the dielectric substrate and the antenna.

2. The onboard antenna of claim 1, wherein a thickness of the metal block is the same as a thickness of the antenna.

3. The onboard antenna of claim 2, wherein the antenna is an array antenna.

4. The onboard antenna of claim 1, wherein a first metal edge of the first metal block away from the antenna is apart from the first substrate edge by a first set value, the antenna is apart from a second metal edge of the first metal block by a second set value, the first metal edge of the first metal block and the second metal edge of the first metal block are opposite edges, and the second set value is greater than the coupling threshold.

5. The onboard antenna of claim 1, wherein a third metal edge of the first metal block is apart from the third substrate edge of the dielectric substrate by a third set value, a fourth metal edge of the first metal block is apart from the fourth substrate edge of the dielectric substrate by a fourth set value, and the third metal edge of the first metal block and the fourth metal edge of the first metal block are opposite edges.

6. The onboard antenna of claim 1, wherein a first metal edge of the second metal block away from the antenna is apart from the second substrate edge by a fifth set value, the antenna is apart from a second metal edge of the second metal block by a sixth set value, the first metal edge of the second metal block and the second metal edge of the second metal block are opposite edges, and the sixth set value is greater than the coupling threshold.

7. The onboard antenna of claim 1, wherein a third metal edge of the second metal block is apart from the third substrate edge by a seventh set value, a fourth metal edge of the second metal block is apart from the fourth substrate edge by an eighth set value, and the third metal edge of the second metal block and the fourth metal edge of the second metal block are opposite edges.

8. The onboard antenna of claim 1, wherein a first metal edge of the third metal block is apart from the third substrate edge by a ninth set value, the antenna is apart from a second metal edge of the third metal block by a tenth set value, the first metal edge of the third metal block and the second metal edge of the third metal block are opposite edges, and the tenth set value is greater than the coupling threshold.

9. The onboard antenna of claim 1, wherein a first metal edge of the fourth metal block is apart from the fourth substrate edge by an eleventh set value, the antenna is apart from a second metal edge of the fourth metal block by a twelfth set value, the first metal edge of the fourth metal block and the second metal edge of the fourth metal block are opposite edges, and the twelfth set value is greater than the coupling threshold.

10. The onboard antenna of claim 1, wherein a third metal edge of the third metal block and a third metal edge of the fourth metal block are located on an extension line of a second metal edge of the first metal block, and a first metal edge of the third metal block is connected to the third metal edge of the third metal block.

11. The onboard antenna of claim 1, wherein a fourth metal edge of the third metal block and a fourth metal edge of the fourth metal block are located on an extension line of a second metal edge of the second metal block, a third metal edge of the third metal block and the fourth metal edge of the third metal block are opposite edges, and a third metal edge of the fourth metal block and the fourth metal edge of the fourth metal block are opposite edges.

12. The onboard antenna of claim 1, wherein the antenna is an array antenna.

13. A radio equipment comprising the onboard antenna of claim 1 and an integrated circuit, wherein the integrated circuit transmits and/or receives radio signals through the onboard antenna, to achieve target detection and/or communication.

14. The radio equipment of claim 13, wherein the radio equipment comprises a radar sensor.

15. An electronic device comprising:

a device body; and, the radio equipment of claim 13, which is arranged on the device body;

wherein the radio equipment is configured to perform target detection and/or communication to provide reference information for operation of the device body in the electronic device.

* * * * *